Jan. 9, 1968     R. K. ERICSON     3,362,512
VARIABLE SPRING RATE CLUTCH DAMPER
Filed Dec. 13, 1965
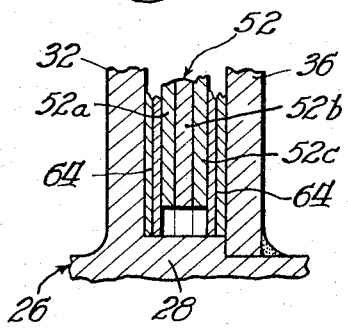
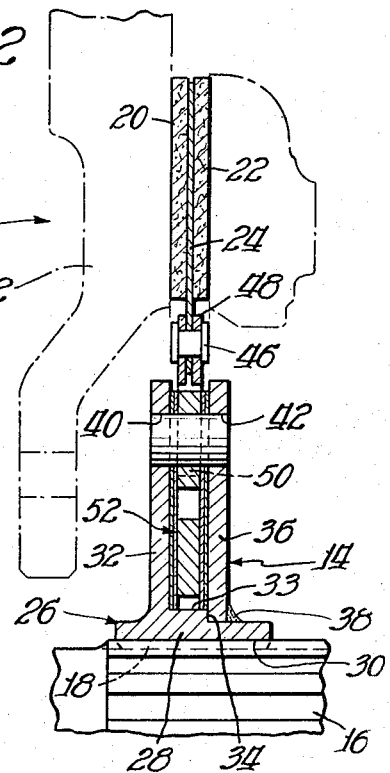
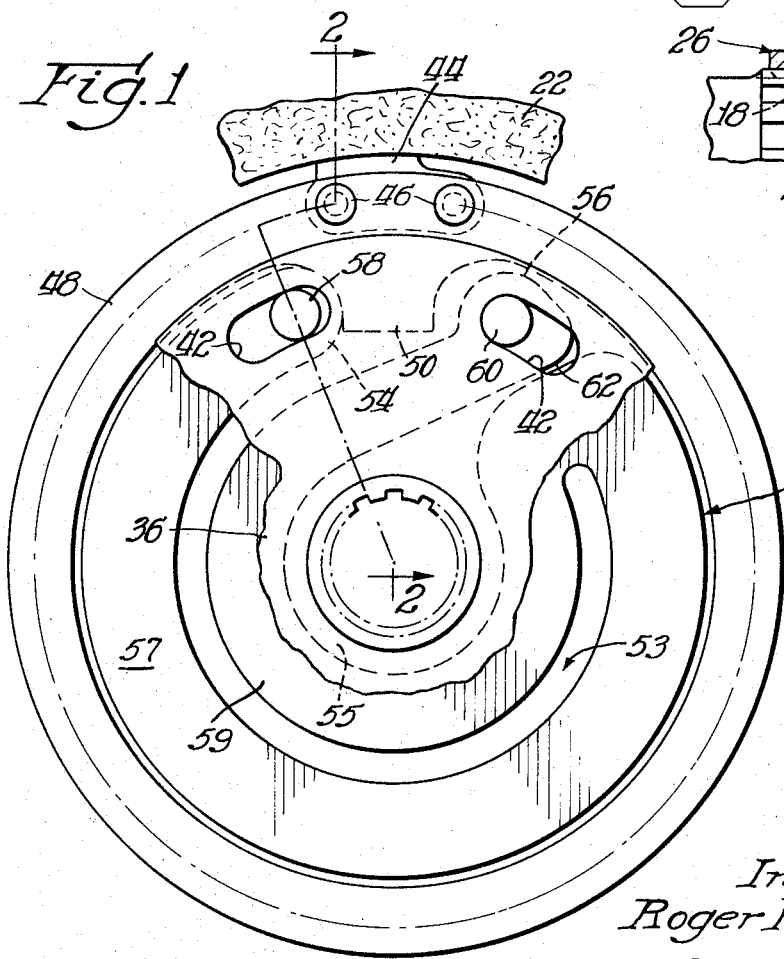
Inventor:
Roger K. Ericson
By: Robert L. Zieg, Atty.

United States Patent Office 3,362,512
Patented Jan. 9, 1968

3,362,512
VARIABLE SPRING RATE CLUTCH DAMPER
Roger K. Ericson, Arlington Heights, Ill., assignor to Borg-Warner Corporation, Chicago, Ill., a corporation of Illinois
Filed Dec. 13, 1965, Ser. No. 513,297
3 Claims. (Cl. 192—68)

ABSTRACT OF THE DISCLOSURE

A clutch damper in which torque is transmitted from a drive plate to a driven plate by means of a relatively flat torsion spring which is constrained so that it distorts only inwardly with respect to the axis of rotation and in which the resistance to distortion increases when the torque apply reaches a predetermined value.

---

This invention relates to resilient couplings and more particularly to a coupling for resiliently connecting the drive plate and the driven plate of a clutch for an automotive vehicle.

A principal object of the invention is to provide a resilient coupling having more torsional windup than conventional dampers having circumferentially spaced compression springs. Dampers of the compression spring type are limited in effectiveness because the cross sectional area of the compression springs is relatively great to be able to withstand the relatively high torques of modern engines, and the springs tend to bind before adequate windup is obtained. Another disadvantage of conventional clutch dampers is that the number of compression springs is limited by the size of the openings necessary for reception of the compression springs.

Another object of the invention is to provide a clutch damper in which the conventional compression springs are eliminated and a torsion spring substituted therefor.

Another object of the invention is to provide a clutch damper in which the spring rate varies in response to torque conditions.

Another object of the invention is to provide a clutch damper which may be conveniently and economically fabricated from sheet metal and which may take the form of a laminated spring assembly having a plurality of bonded layers of sheet metal.

Another object of the invention is to provide a clutch damper of the stated type which is efficient in either direction of rotation and which is provided with a damper disc which is cut out so that it tends to wind with respect to the driven plate as torque is applied to the periphery thereof.

These and other objects of the invention will become apparent as the description proceeds with respect to the accompanying drawings:

FIGURE 1 is an elevational view, partly broken away, of a resilient coupling made in accordance with the present invention;

FIGURE 2 is a vertical sectional view taken substantially on line 2—2 of FIGURE 1;

FIGURE 3 is an enlarged elevational sectional view of certain details of FIGURE 2.

Referring to the drawings, and more particularly to FIGURES 1 and 2, there is illustrated a clutch 10 comprising a driving element 12 and a driven element 14. Power may be transmitted from an engine to the driving element 12 for rotation of the driven element 14 and consequent rotation of output shaft 16 to which the driven element 14 is splined at 18. The outer periphery of the driven element 14 is provided with friction facings 20 and 22 secured respectively on each side of an annular disc 24. Forming a part of the driven element 14 is a hub assembly 26 the purpose of which being to transmit power resiliently to the output shaft 16. The hub assembly 26 includes a body portion 28 having a central opening 30 splined as above described to a correspondingly splined portion of the output shaft 16. Extending radially outwardly from the body portion 28, and integral therewith, is a disc 32. The body portion 28 is formed with a ledge 33 and a shoulder 34 against which abuts the inner marginal edge of a disc 36 which is secured to the body portion 28 by means of weldments 38. The disc 32 is provided with a pair of circumferentially spaced elongated slots 40 while the disc 36 is provided with a pair of slots 42 in register with the slots 40.

According to an important feature of the present invention the disc 24 is formed with a radially inwardly extending tang 44 which is secured, by means of circumferentially spaced rivets 46, to a drive ring 48. Extending inwardly from the inner periphery of the drive ring 48 is a drive tab 50 which is secured to the drive ring 48 by means of the rivets 46. A damper spring or disc 52 is arranged between the disc 32 and the disc 36 and is operative upon actuation by the drive tab 50 to dampen power surges before they reach the output shaft 16. The spring 52, as best shown in FIGURES 1 and 3, is formed of at least one layer of sheet metallic material and may comprise a plurality of layers bonded each to the other as shown in FIGURE 3. The disc 52 is cut out to provide an elongated arcuate slot 53 with a tear-shaped central opening 55. These openings define two concentric arcuate connected runs 57 and 59 terminating in a pair of free ends 54 and 56 which are apertured for reception of drive pins 58 and 60, respectively.

Assuming rotation of the drive ring 48 in a counterclockwise direction, the drive tab 50 moves against the end 54 of the spring 52 to move the drive pin 60 in a counterclockwise direction until it engages the edges defining the slots 40 and 42 through which the drive pin extends. As this occurs, outer run 57 of the disc 52 is rotated counterclockwise to impart a clockwise winding motion to inner run 59. As the outer run 57 is rotated, vibrations transmitted to it by the drive tab 50 are dampened at a predetermined rate until the juncture between run 57 and run 59 engages the end 56 at 62. Then, vibrations are dampened at a reducing rate until the pin 58 touches the discs 32 and 36. Stated another way, the spring rate of the disc 52 is smaller until the juncture of the rungs touches at 62 than after the contact occurs.

As shown best in FIGURE 3, the spring 52 may comprise a plurality of separate layers of sheet metallic material 52a, 52b and 52c. Movement of the disc 52 is controlled by friction washers 64. It will be appreciated that the damper of the present invention operates equally well in either direction of rotation of the drive ring 48. The spring 52 is designed as to have a slight preload when assembled in the coupling.

The clutch damper of the present invention exhibits important advantages over clutch dampers heretofore known. For instance, the spring or disc 52 is capable of greater windup than that afforded by the conventional circumferentially spaced compression springs.

Another advantage of the damper of the present invention is its relatively low cost as compared to conventional dampers. Also, the present damper is characterized by relative ease of installation and may be designed for varying torques merely by varying the number of laminations employed.

Various of the features of the invention have been particularly shown and described; however, it should be obvious to one skilled in the art that various modifications may be made therein without departing from the scope of the invention.

I claim:
1. A clutch comprising a driving member and a driven member, said driven member including a drive element and a driven element, a damper means comprising a disc-like spring resiliently connecting said drive element and said driven element, said spring being formed with an elongated arcuate slot extending from the outer periphery thereof and in an arcuate path in equally spaced relation to the periphery of the spring so that torque surges from said drive element distort said spring radially inwardly before the torque is transmitted to said driven element.

2. A clutch damper for a clutch having a driving member and a driven member, said driven member comprising a drive element and a driven element, a disc-like spring adapted to be rotated by said drive element, said spring being formed with an elongated slot extending from the outer periphery thereof and thence in an arcuate path in equally spaced relation to the periphery of said spring, said spring having a central opening cooperating with said slot to define a sinuous body portion having an inner and an outer section, said body having two ends in confronting relation each to the other at the periphery of the spring, each of said ends being apertures for reception of a pin, said driven element including a hub assembly having a pair of spaced parallel radially outwardly extending discs, each of said discs having a pair of elongated slots, the slots of one of said discs being in register with the slots in the other of said discs, each of said pins being received in a registering pair of slots, said drive element including a drive ring having a radially inwardly extending drive tab, said drive tab being operative upon rotation of said drive element to engage one of the ends of said spring body and to wind said spring sections at a predetermined spring rate until said body touches the other of said ends so that further windup is at an increased spring rate, said one pin being relatively movable with respect to said driven element until it engages the edges of the associated registered slots whereby torque is then directly transmitted from said drive element to said driven element.

3. A clutch damper comprising a driving member and a driven member, said driven member including a drive element, and a driven element, and a resilient disc rotated by said drive element for rotation of said driven element, said disc comprising a circumferentially disposed outer section and a circumferentially disposed inner section coplanar with said outer section and connected thereto, said outer section having a free end provided with an aperture and said inner section having a free end disposed adjacent the periphery of the disc and provided with an aperture, a drive pin received in each of said apertures, said driven element including a pair of spaced parallel radially outwardly extending discs, a pair of elongated slots adjacent the outer marginal edge of each of said discs, each of said pairs being in register with the other of said pairs, each of said drive pins being received in a registering pair of slots, whereby torque applied by said drive element effects sequential winding of said disc sections at a predetermined rate until the juncture between said sections engages one of said ends and thence at a predetermined increased rate.

References Cited

UNITED STATES PATENTS

| | | | |
|---|---|---|---|
| 2,080,455 | 5/1937 | Bechtel | 192—68 |
| 2,114,247 | 4/1938 | Davis. | |
| 2,141,014 | 12/1938 | Nutt | 192—68 |
| 2,177,362 | 10/1939 | Eason | 192—68 |

DONLEY J. STOCKING, *Primary Examiner.*

ARTHUR T. McKEON, *Examiner.*